United States Patent

Rassier et al.

[11] Patent Number: 6,045,020
[45] Date of Patent: Apr. 4, 2000

[54] SPORTS GEL PACKET CARRIER

[76] Inventors: James E. Rassier; Carolyn M. Skjefte, both of 3723 - 140th Ave. NW., Andover, Minn. 55304

[21] Appl. No.: 09/067,404

[22] Filed: Apr. 28, 1998

[51] Int. Cl.[7] .................................. B62J 11/00; B62J 7/06
[52] U.S. Cl. ......................... 224/414; 224/463; 224/420; 224/436; 224/148.5; 224/237
[58] Field of Search .............................. 224/148.1, 148.4, 224/148.7, 219, 222, 235, 236, 237, 242, 245, 249, 250, 412, 414, 420, 428, 436, 437, 439, 463, 920, 650, 651, 655, 911, 914; 150/111

[56] References Cited

U.S. PATENT DOCUMENTS

| | | |
|---|---|---|
| 452,977 | 5/1891 | Lamson . |
| 3,107,782 | 10/1963 | Jaroff et al. . |
| 4,176,770 | 12/1979 | Griggs et al. . |
| 4,182,463 | 1/1980 | Austin . |
| 4,993,586 | 2/1991 | Taulbee et al. . |
| 5,199,619 | 4/1993 | Mostashari . |
| 5,407,111 | 4/1995 | Lanouette et al. . |
| 5,497,920 | 3/1996 | Moeller et al. . |

Primary Examiner—Gregory M. Vidovich
Attorney, Agent, or Firm—Edwin E. Voigt II; Vidas, Arrett & Steinkraus

[57] ABSTRACT

The bicycle sports gel packet carrier is adapted to be releasably engaged to the throat or stem of a bicycle proximate to the handlebars and is further adapted to transport sports gel packets for consumption by a bicyclist during a bicycle race. The bicycle sports gel packet carrier is formed of a body having a first affixation member to releasably secure the body to the throat or stem. At least one tab grasper is engaged to the body proximate to the top. The tab graspers include receiving slots adapted to receive a tab of a sports gel packet and further include a tearing edge used to assist in the separation of the sports gel packet from the tab. An elongate strap may be integral or attached to the body to further secure the body about the throat or stem. At least one flap is pivotally engaged to the body to releasably cover a sports gel packet during transportation on a bicycle. The flaps may include expanders and engagement edges for releasable affixation of the flap to the exterior of the body. The interior of the flap may also include a pocket for carrying an empty sports gel packet following consumption by an individual to reduce litter.

16 Claims, 3 Drawing Sheets

SPORTS GEL PACKET CARRIER

BACKGROUND OF THE INVENTION

Bicyclists frequently consume sports gel packets during bicycle races or bicycle trips to provide energy and necessary nutrients for maximization of sustained optimal athletic performance.

In the past, the sports gel packets have been transported by bicyclists in pockets integral to a cyclist's clothing frequently positioned proximate to the cyclist's back. To retrieve a sports gel packet, the cyclist in the past was required to remove a hand from the handlebars in order to reach behind the individual's back to retrieve the sports gel packet. Convenience of retrieval of a sports gel packet was, therefore, not provided. Frequently, during retrieval attempts, a sports gel packet became entangled in the cyclist's clothing or was not conveniently removed from a pocket which resulted in the cyclist dropping the sports gel packet to the ground unconsumed. A bicyclist within a race then did not stop to retrieve a fallen or dropped sports gel packet. In addition, during a bicycle race, the road surface is frequently uneven or not smooth. The retrieval of a sports gel packet from behind an individual's back during bicycle racing at relatively high speeds over a rough road or off-road surface is quite difficult resulting in significant loss of sports gel packets due to droppage. No device is known which transports a sports gel packet in a convenient location proximate to the handlebars of a bicycle which minimizes risk of droppage of a sports gel packet during a bicycle race.

Another drawback of the use of sports gel packets during bicycle races as known is the resulting litter which occurs due to the inconvenient disposal of the tabs or empty sports gel packets following consumption. In the past, the tabs of a sports gel packet upon retrieval by a bicyclist were frequently placed in the cyclist's teeth to effectuate grasping for tearing or opening. The cyclist then frequently spat the tab upon the ground due to the inconvenient and/or non-existent method of disposal of the tab. No device was known which conveniently grasped the tab of a sports gel packet for opening which eliminated the necessity for droppage or disposal and resulting litter during the use of a sports gel packet within a bicycle race. In addition, an empty packet of sports gel was frequently dropped to the ground by a cyclist during a bicycle race due to the failure of a convenient transportation location accessible to the bicyclist. No device was known which provided a convenient location for transportation of empty packets of sports gel during a bicycle race. These and other drawbacks related to the use of sports gel packets during bicycle races are overcome by the sports gel packet carrier disclosed and claimed herein.

SUMMARY OF THE INVENTION

It is a principal object of the present invention to provide a sports gel packet carrier for convenient engagement to a bicycle which is of relatively simple and inexpensive design, construction, and operation and which is safe and which fulfills the intended purpose of conveniently carrying sports gel packets while simultaneously reducing litter without fear of damage to property and/or injury to persons.

It is another principal object of the present invention to provide a sports gel packet carrier which eliminates the necessity for a cyclist to use their teeth to grasp the tab for opening of a sports gel packet for consumption during a bicycle race.

It is still another object of the present invention to provide a sports gel packet carrier which improves the safety of a bicycle race by eliminating the necessity for a cyclist to reach behind the cyclist's back to retrieve a sports gel packet.

It is still another object of the present invention to provide a sports gel packet carrier which reduces the instances of waste or loss through the inadvertent droppage of a sports gel packet by a cyclist during a bicycle race.

It is still another principal object of the present invention to provide a sports gel packet carrier which facilitates the transportation of a sports gel packet during a bicycle race or a trip.

It is still another principal object of the present invention to provide a sports gel packet carrier which reduces litter by grasping the tab of a sports gel packet during use by a cyclist.

It is still another principal object of the present invention to provide a sports gel packet carrier which reduces litter by providing an area to conveniently transport an empty packet of sports gel following consumption by a bicyclist.

A feature of the present invention is the provision of a body which is preferably adapted to engage the throat or stem of a bicycle proximate to the handlebars.

Another feature of the present invention is the provision of a body having a first affixation member enabling the releasable attachment of the sports gel packet carrier to the throat or stem of a bicycle.

Still another feature of the present invention is the provision of a tab grasper adapted to securely hold the tab of a sports gel packet during transportation and/or opening.

Still another feature of the present invention is the provision of at least one flap adapted to releasably secure a sports gel packet to the body.

Still another feature of the present invention is the provision of an elongate strap adapted to assist in releasable attachment of the sports gel packet carrier to the throat or stem of a bicycle.

Still another feature of the present invention is the provision of an elongate strap which engages a tab grasper to assist in securing of a tab of a sports gel packet to the sports gel packet carrier following opening.

Still another feature of the present invention is the provision of a flap having an expander adapted to transport sports gel packets of varying size.

Still another feature of the present invention is the provision of a grasping tab affixed to the flap to assist in the opening of the flap for retrieval of a sports gel packet by an individual.

Still another feature of the present invention is the provision of a sports gel packet carrier having two flaps and two tab graspers.

Still another feature of the present invention is the provision of an adjuster integral to said expander to enable a cyclist to selectively adjust the size of the flap.

Still another feature of the present invention is the provision of a tab grasper having a slot and a tearing edge.

DETAILED DESCRIPTION OF THE PREFERRED EMBODIMENT

Figure 1:
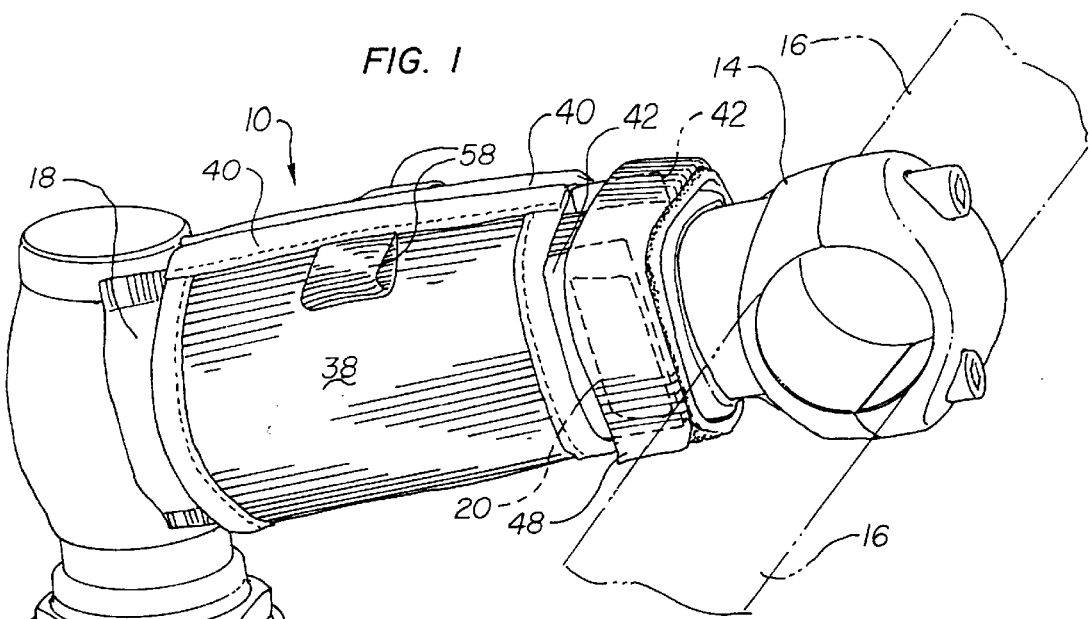
FIG. 1 is an environmental view of the sports gel packet carrier as engaged to the throat or stem of a bicycle.

One form of the sports gel packet carrier is disclosed herein. In general, the sports gel packet carrier is identified by the numeral 10. The sports gel packet carrier 10 is preferably adapted for releasable attachment to a bicycle having a frame 12, a throat or stem 14 extending from the frame 12, and handlebars 16 which are preferably adapted to be engaged to and extend outwardly from the throat or stem 14.

The sports gel packet carrier 10 is preferably adapted to transport a sports gel packet 18 during a bicycle race or over an extended bicycle trip. The sports gel packet 18 preferably includes a tear-away tab 20 which may be removed from the sports gel packet 18 for consumption of the sports gel by a bicyclist. The sports gel packets 18 preferably are available in a variety of sizes and diameters for consumption by athletes during prolonged athletic events.

The sports gel packet carrier 10 preferably includes a body 22, which in general includes an interior 24, an exterior 26, a first affixation member 28, a top 30, a bottom 32, a first end 34, and a second end 36.

The body 22 may be preferably formed of canvas, fabric, plastic, rubber, and/or any other desired material as preferred by an individual provided that the essential functions, features, and attributes described herein are not sacrificed.

Figure 2:
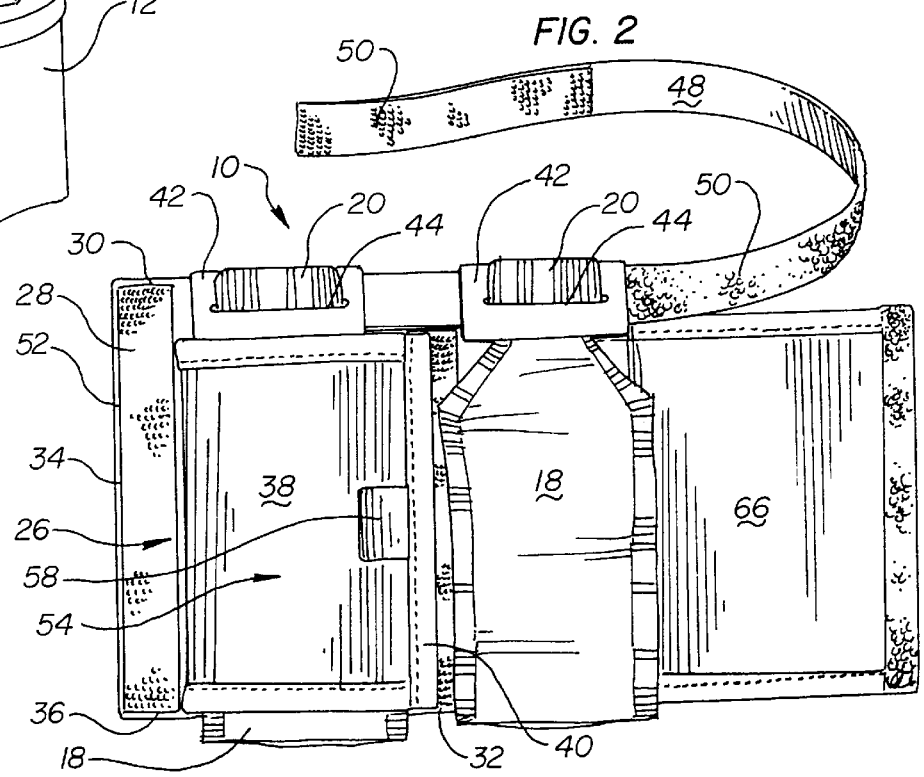
FIG. 2 is a perspective view of the sports gel packet carrier.
Figure 3:
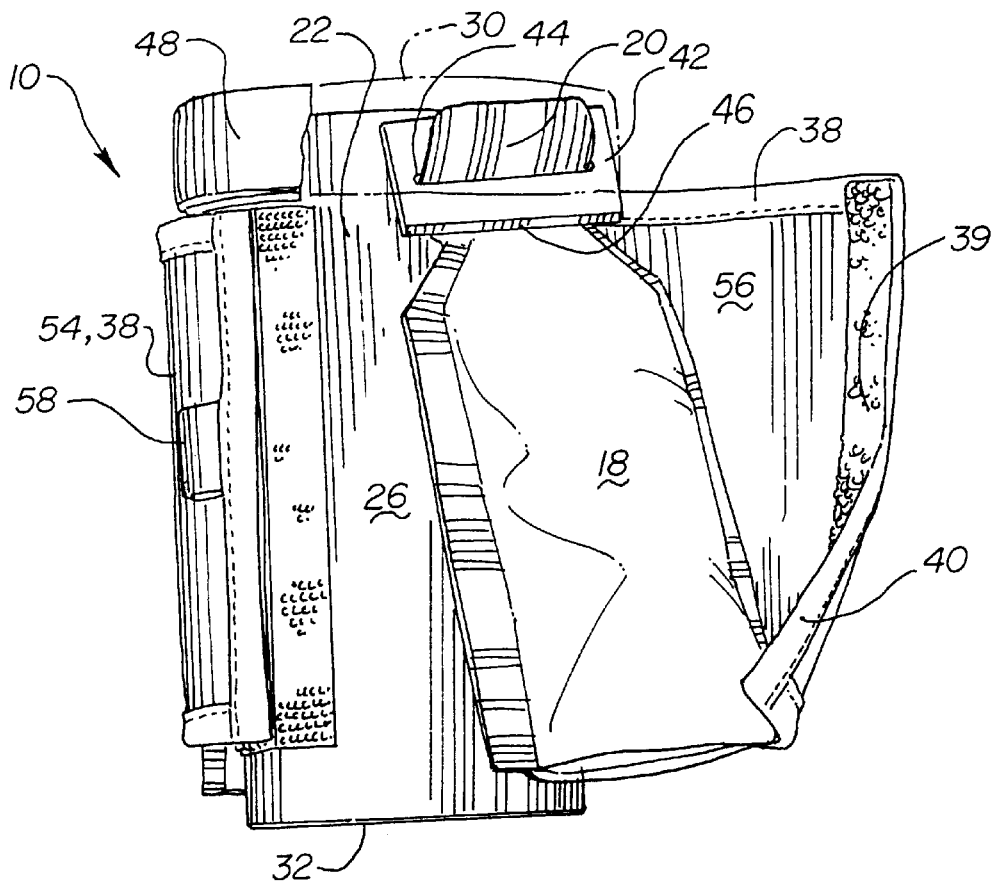
FIG. 3 is an alternative environmental view of the sports gel packet carrier engaged to the throat or stem of a bicycle.
Figure 5:
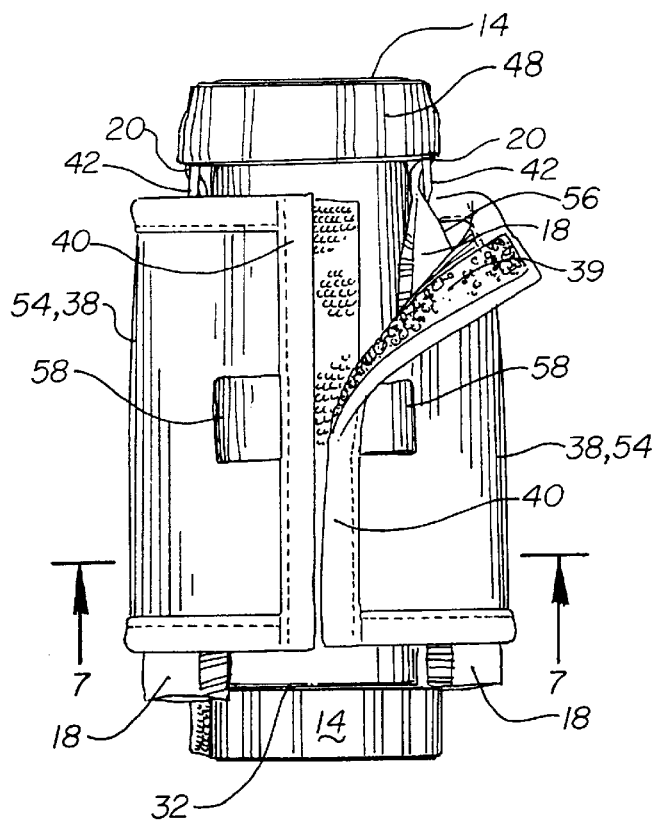
FIG. 5 is an alternative environmental view of the sports gel packet carrier as engaged to the throat or stem of a bicycle.
Figure 6:
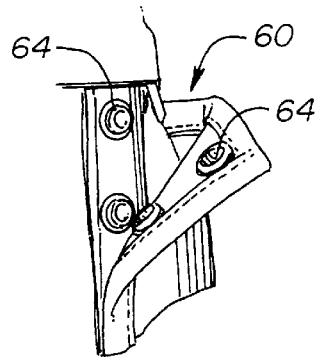
FIG. 6 is a detailed view of the expander.

As may be seen in FIGS. 2, 3, and 5, the first affixation member 28 is preferably adapted to releasably secure the exterior 26 of the first end 34 to the interior 24 of the second end 36 to releasably engage the body 22 about the throat or stem 14 of a bicycle. The first affixation member 28 may preferably include mating hook material proximate to the exterior 26 of the first end 34 and a corresponding portion of loop material proximate to the interior 24 of the second end 36. It should be noted that any desired affixation mechanism may be used for the first affixation member 28 including but not limited to the use of zippers, snaps, buckles, penetrating and receiving turn button stud fasteners, or any other desired affixation mechanism provided that the essential functions, features, and attributes described herein are not sacrificed.

As may be seen in FIGS. 2, 3, and 5, mating hook material may be integral or engaged to the exterior 26 of the body 22 and positioned centrally thereon for preferable positioning between the flaps 38. The hook material as mounted or as integral to the exterior 26 of the body 22 is preferably adapted for releasable engagement to mating loop material integral or affixed proximate to the engagement edges 40 of the flaps 38.

The top 30 of the body 22 is preferably adapted for positioning proximate to the handlebars 16 when the sports gel packet carrier 10 is releasably engaged to the throat or stem 14 of a bicycle. During affixation, the first end 34 is preferably positioned on the undersurface of the throat or stem 14 which is opposite to a cyclist. The interior 24 of the second end 36 may then be positioned adjacent to and above the exterior 26 of the first end 34 for releasable engagement thereto. By the coupling of the first affixation member 28 together, the sports gel packet carrier 10 is preferably releasably secured to the throat or stem 14 of a bicycle. In this configuration, the flaps 38 are preferably positioned above the throat or stem 14 in a convenient location for grasping by a cyclist during biking activities.

It should be noted that zippers, snaps, penetrating and receiving turn button stud fasteners and/or any other affixation mechanism as desired may be utilized for releasable attachment of the body 22 about the throat or stem 14 of a bicycle.

Figure 4:
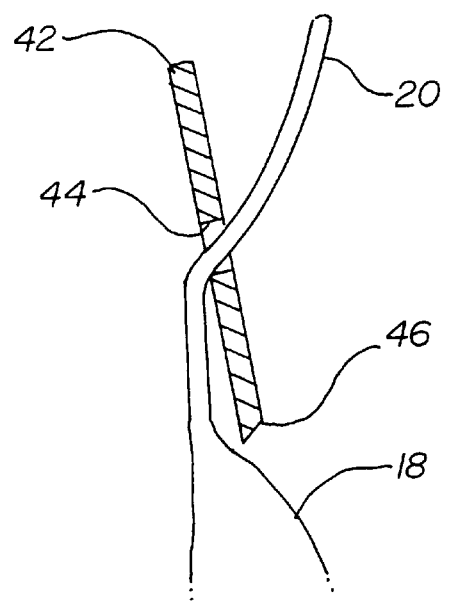
FIG. 4 is a cross-sectional side view of the tab grasper and tab of a sports gel packet.

As may be seen in FIGS. 3 and 4, a tab grasper 42 is preferably engaged to the body 22 proximate to the top 30. In general, the tab grasper 42 includes a receiving slot 44 and a tearing edge 46.

It should be noted that the tab grasper 42 may be preferably attached to the body 22 at any location as desired by an individual provided that the location of the tab grasper 42 positions and/or places the sports gel packet 18 in a convenient location for grasping by an individual.

The sports gel packet carrier 10 preferably includes two tab graspers 42 to releasably couple two sports gel packets 18 to the throat or stem 14 of a bicycle during a bicycle race.

The tab graspers 42 are preferably adapted to releasably hold the tab 20 of the sports gel packet 18 and to retain the tab 20 upon removal of the sports gel packet 18 from the tab 20 during consumption of gel material by an individual.

It should be noted that a clamp mechanism may be substituted for the tab grasper 42 as preferred by an individual. The tab grasper 42 may be integral or securely affixed to the exterior 26 of the body 22 through the use of stitching, adhesives, rivets, snaps, and/or studs as preferred by an individual provided that the tab graspers 42 do not separate from the body 22 during use of the sports gel packet carrier 10.

It should be noted that the tear-away tab 20 of the sports gel packet 18 is preferably threadably positioned within the receiving slot 42 as depicted in FIGS. 3 and 4. In this embodiment, the tear-away tab 20 is preferably inserted through the receiving slot 44 from below for extension above the receiving slot 44 toward the top 30 of the body 22. In this configuration, the tear-away portion of the tab 20 is preferably positioned adjacent to and below the tearing edge 46 of the tab grasper 42. A cyclist may then grasp the sports gel packet 18 for rotation and lifting of the sports gel packet 18 relative to the tearing edge 46 of the tab grasper 42 for separation of the tear-away tab 20 from the sports gel packet 18. The sports gel packet 18 is then preferably opened in order to provide a passageway for consumption of sports gel to replenish a cyclist's nutrients and energy for optimization of athletic performance.

An elongate strap 48 may preferably be integral or releasably engaged to the top 30 of the body 22. The elongate strap 48 is preferably adapted for surrounding engagement of the throat or stem 14 for assisting in the retention of the sports gel packet carrier 10 about the throat or stem 14 of a bicycle.

The elongate strap 48 preferably wraps around and engages the exterior of each tab grasper 42 to securely hold the tab 20 within a tab grasper 42 following separation of a sports gel packet 18. The elongate strap 48 then assists in preventing the tabs 20, as separated from the sports gel packet 18, from slippage out of the receiving slots 44 which thereby minimizes litter.

The elongate strap 48 may initiate at or be integral to the top 30 proximate to the second end 36. The elongate strap 48 may then be wrapped about the throat or stem 14 of the bicycle whereon the elongate strap 48 may be releasably engaged to the top 30 of the first end 34 through the mating engagement of hook-and-loop fabric material. Alternatively, the top 30 of the first end 34 may include snaps and/or buckles, and the elongate strap 48 may include mating snaps and/or buckles for affixation about the throat or stem 14.

It should be noted that the elongate strap 48 may be formed of resiliently flexible and stretchable material at the discretion of an individual and is preferably designed to function to assist in the secure holding and positioning of the sports gel packet carrier 10 relative to and about the throat or stem 14 of the bicycle.

The elongate strap 48 may also preferably include portions of hook or loop fabric material 50 for convenient releasable affixation of the elongate strap 48 about the throat or stem 14.

One or more flaps 38 may be integral or affixed to the exterior 26 of the body 22. In the preferred embodiment, the sports gel packet carrier 10 preferably includes two flaps 38.

In general, each flap 38 preferably includes an affixation edge 52 which preferably provides pivotal attachment of the flap 38 relative to the body 22. The affixation edges 52 of the flaps 38 may extend vertically between the top 30 and the bottom 32 at the preference of an individual. Alternatively, the affixation edge 52 of the flap 38 may extend horizontally proximate to the bottom 32 at the discretion of an individual.

In the preferred embodiment, an engagement edge 40 is preferably opposite to the affixation edge 52. Each flap 38 also preferably includes an exterior 54 and an interior 56.

As may be seen in FIGS. 2, 3, and 5, the interior 56 of the flap 38 preferably includes mating loop material proximate to the engagement edges 40 for the provision of releasable affixation to the hook material as centrally positioned on the exterior 26 of the body 22.

The affixation edge 52 may be secured to the exterior 26 of the body 22 by any means as preferred by an individual including but not limited to the use of stitching, zippers, snaps, and/or rivets provided that the affixation mechanism selected provides for pivotal rotation of the flap 38 relative to the exterior 26 of the body 22.

In the preferred embodiment, the engagement edges 40 of the two flaps 38 are preferably positioned proximate to each other and extend substantially between the top 30 and the bottom 32 centrally with respect to the body 22. In this embodiment, the flaps 38 preferably open outwardly from the center of the body 22 for receiving engagement of sports gel packets 18 or the exposure of sports gel packets 18 for use during a bicycle race.

Each flap 38 preferably includes an engagement member 39 which is preferably adapted for positioning adjacent to an engagement edge 40. The engagement members 39 selected for the flaps 38 preferably releasably secure the engagement edges 40 of the flap 38 to the exterior 26 of the body 22. The mechanism selected for the engagement members 39 may vary considerably at the discretion of an individual and may include but are not necessarily limited to the use of mating hook-and-loop fabric material, zippers, snaps, and/or penetrating or receiving turn button stud fasteners.

In an alternative embodiment, the affixation edge 52 of the flaps 38 may extend substantially horizontally proximate to the bottom 32 of the body 22. In this embodiment, each flap 38 preferably includes a pair of vertically-extending engagement edges 40 which may each include engagement members 39 proximate thereto. In this embodiment, the engagement edges 40 may extend upwardly from the bottom 32 toward the top 30 for any desired distance as preferred by an individual for the covering of a sports gel packet 18. It should be noted that in this embodiment that the exterior 26 of the body 22 may include a plurality of sections of hook material which are preferably adapted for receiving and coupling engagement to mating loop material as positioned on the interior 56 of the flap 38 proximate to the engagement edges 40. In this embodiment, the mating hook-and-loop fabric material forms the engagement member 39 of the sports gel packet carrier 10. In this embodiment, the flap 38 is preferably opened downwardly toward a bicyclist for exposure of the sports gel packet 18 for retrieval and consumption.

It should be noted that the flaps 38 are preferably adapted for covering relationship over a sports gel packet 18 during use of the sports gel packet carrier 10. It should be noted that the engagement members 39 selected for the embodiment where each flap 38 includes two engagement edges 40 may be formed of mating hook-and-loop fabric material, penetrating and receiving snaps, zippers, penetrating and receiving turn button stud fasteners, and/or any other affixation mechanism as preferred by an individual provided that the affixation mechanism selected facilitates the convenient separation of the engagement edges 40 from the exterior 26 of the body 22 during use of the sports gel packet carrier 10.

Each flap 38 preferably includes a grasping tab 58 which may be integral or affixed to the exterior 54 of the flap 38 proximate to the engagement edges 40. A cyclist may then conveniently retract the grasping tab 58 for exposure of a sports gel packet 18 for consumption during a bicycle race.

Figure 7:
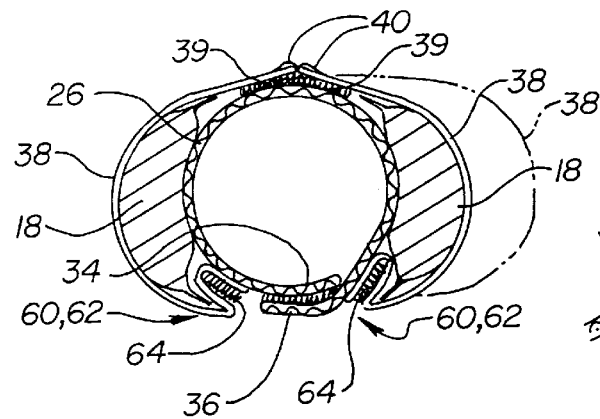
FIG. 7 is a cross-sectional bottom view of the sports gel packet carrier taken along the line of 7—7 of FIG. 5.
Figure 8:
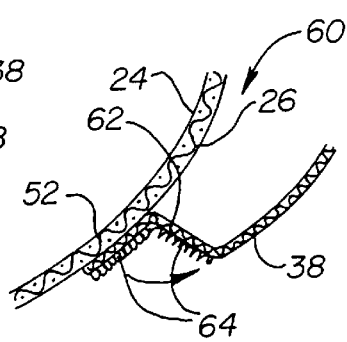
FIG. 8 is a detailed cross-sectional view of the expander in an open position.

Each flap 38 may include an expander 60 which is preferably positioned proximate to the affixation edges 52. The expander 60 may be formed of a fold 62 in the flap 38 which provides flexibility with respect to the selection of the size for the flap 38 for covering sports gel packets 18. Each expander 60 may include an adjuster 64 which releasably closes the fold 62 to reduce the size of the flap 38 as desired by a cyclist. The adjusters 64 may be comprised of mating hook-and-loop fabric material as depicted in FIGS. 7 and 8. Alternatively, the adjusters 64 may be formed of any affixation mechanism as desired by an individual including but not limited to the use of zippers and/or penetrating and receiving snaps as desired by an individual. The provision of an expander 60 including a fold 62 and adjuster 64 provides flexibility for the sports gel packet carrier 10 enabling a cyclist to adjust the dimensions for the flap 38 for carrying sports gel packets 18 having either larger or smaller diameters.

Each flap 38 may additionally include a pocket 66 which is positioned on the interior 56 of the flap 38 as depicted in FIG. 2. The pocket 66 is preferably adapted for the carrying and transportation of empty sports gel packets 10 following consumption by an individual. The provision of the pocket 66 preferably minimizes the litter associated with the use of sports gel packets 18 by a cyclist during prolonged bicycle trip and/or bicycle race.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A sports gel packet carrier for carrying a sports gel packet having a tab, the sports gel packet carrier comprising:

(a) a body having an interior, an exterior, a top, a bottom, a first end, a second end, and a first affixation member;

(b) at least one tab grasper attached to said exterior of said body proximate to said top;

(c) at least one flap engaged to said body, the at least one flap having an engagement member positioned adjacent to an engagement edge thereof adapted to releasably secure the respective flap to an the exterior of said body, the engagement member extending substantially between said top and said bottom, an expander formed of a fold in the at least one flap opposite to said engagement edge having an adjuster, the at least one flap adapted for positioning over said sports gel packet.

2. The sports gel packet carrier of claim 1, said first affixation member comprising a portion of hook material proximate to said exterior of said first end and a portion of loop material proximate to said interior of said second end.

3. The sports gel packet carrier of claim 2, wherein the at least one tab grasper is two tab graspers.

4. The sports gel packet carrier of claim 3, wherein the engagement edge extends substantially between said top and said bottom.

5. The sports gel packet carrier of claim 4, each of said flaps further comprising an interior.

6. The sports gel packet carrier of claim 5, wherein said at least one flap is two flaps each said flap further comprising mating loop material on said interior of said engagement edges, said body further comprising mating hook material on said exterior thereof for engagement with said engagement members.

7. The sports gel packet carrier of claim 6, wherein each of said flaps is adapted to cover a respective sports gel packet.

8. The sports gel packet carrier of claim 7, wherein each of said tab graspers is respectively adapted to releasably hold a respective tab of a respective sports gel packet and to retain said tab upon removal of said sports gel packet from said tab upon opening of ,aid sports gel packet.

9. The sports gel packet carrier of claim 8, further comprising an elongate strap, the elongate strap having hook and loop fabric material for releasable engagement to said top of said first end of said body.

10. The sports gel packet carrier of claim 9, wherein said strap is adapted to encircle the throat or stem of a bicycle.

11. The sports gel packet carrier of claim 10, wherein said body is adapted to releasably encircle a throat or stem of a bicycle.

12. The sports gel packet carrier of claim 11, each said expander comprising a fold in said flap.

13. The sports gel packet carrier of claim 12, said adjuster comprising penetrating and receiving snaps.

14. The sports gel packet carrier of claim 13, each of said tab graspers comprising a slot and a tearing edge.

15. The sports gel packet carrier of claim 1, said at least one tab grasper comprising:

(a) two tab graspers affixed proximate to said top; and (b) said at least one flap comprising two flaps secured to said exterior of said body.

16. A combination bicycle and sports gel packet carrier for carrying a sports gel packet having a tab, comprising:

(a) a bicycle having a frame, a throat or stem extending from said frame, and a handle bar engaged to sail throat or stem; and (b) a sports gel packet carrier comprising:

i. a body having an interior, an exterior, a top, a bottom, a first end, a second end, and a first affixation member, said first affixation member adapted to releasably secure said exterior of said first end to said interior of said second end to releasably engage said body about said throat or stem, said first affixation member comprising a portion of hook material proximate to said exterior of said first end and a portion of loop material proximate to said interior of said second end, said exterior of said body further having a central portion having hook material;

ii. at least one tab grasper attached to said body proximate to said top, said at least one tab grasper comprising a slot and a tearing edge, said at least one tab grasper being adapted to releasably hold said tab of said sports gel packet and retain said tab upon removal of said sports gel packet form said tab; and iii. at least one flap engaged to said body, said flap having an affixation edge adapted to pivotally secure said flap to said body, said flap being adapted for positioning over said sports gel packet, said at least one flap comprising an engagement edge extending substantially between said top and said bottom, an expander opposite to said engagement edge having an adjuster, said flap further comprising an interior having a portion of loop material proximate to said engagement edge adapted to releasably engage said hook material of said central portion of said body.

* * * * *